(12) United States Patent
Prada Gomez et al.

(10) Patent No.: US 9,153,043 B1
(45) Date of Patent: Oct. 6, 2015

(54) SYSTEMS AND METHODS FOR PROVIDING A USER INTERFACE IN A FIELD OF VIEW OF A MEDIA ITEM

(75) Inventors: Luis Ricardo Prada Gomez, Hayward, CA (US); Aaron Joseph Wheeler, San Francisco, CA (US)

(73) Assignee: Google, Inc., Mountain View, CA (US)

( * ) Notice: Subject to any disclaimer, the term of this patent is extended or adjusted under 35 U.S.C. 154(b) by 633 days.

(21) Appl. No.: 13/398,381

(22) Filed: Feb. 16, 2012

(51) Int. Cl.
*G06T 11/00* (2006.01)

(52) U.S. Cl.
CPC ............ *G06T 11/00* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,075,673 | A * | 12/1991 | Yanker | 345/163 |
| 6,184,847 | B1 | 2/2001 | Fateh et al. | |
| 6,515,799 | B2 | 2/2003 | Ishijima et al. | |
| 6,847,336 | B1 | 1/2005 | Lemelson et al. | |
| 6,886,137 | B2 | 4/2005 | Peck et al. | |
| 6,915,490 | B1 * | 7/2005 | Ewing | 715/794 |
| 7,219,309 | B2 | 5/2007 | Kaasila et al. | |
| 7,474,335 | B2 | 1/2009 | Basson et al. | |
| 7,796,873 | B2 | 9/2010 | Uenaka et al. | |
| 7,932,925 | B2 | 4/2011 | Inbar et al. | |
| 2001/0038378 | A1 * | 11/2001 | Zwern | 345/156 |
| 2007/0097150 | A1 * | 5/2007 | Ivashin et al. | 345/660 |
| 2009/0276726 | A1 * | 11/2009 | Allen et al. | 715/784 |
| 2010/0299630 | A1 | 11/2010 | McCutchen et al. | |
| 2011/0169928 | A1 | 7/2011 | Gassel et al. | |
| 2011/0187640 | A1 | 8/2011 | Jacobsen et al. | |
| 2011/0225543 | A1 * | 9/2011 | Arnold et al. | 715/799 |
| 2012/0151406 | A1 * | 6/2012 | Oberstein | 715/784 |
| 2012/0185805 | A1 * | 7/2012 | Louch et al. | 715/862 |

* cited by examiner

*Primary Examiner* — Andrew Yang
(74) *Attorney, Agent, or Firm* — McDonnell Boehnen Hulbert & Berghoff LLP

(57) ABSTRACT

A non-transitory computer-readable medium includes instructions stored thereon for causing a display device to display a field of view of a media item and a user interface over the media item. The field of view defines a reference point and the user interface defines a perimeter. The medium also includes instructions for processing input data for controlling relative movement of one or more of the field of view, the media item, and the user interface. In addition, the medium includes instructions for causing the display device, responsive to the input data, to move the user interface relative to the field of view and the media item, provided that the reference point is within the perimeter. The medium also includes instructions for causing the display device, responsive to the input data, to move the field of view relative to the media item, provided that the reference point is outside the perimeter.

41 Claims, 7 Drawing Sheets

SYSTEMS AND METHODS FOR PROVIDING A USER INTERFACE IN A FIELD OF VIEW OF A MEDIA ITEM

BACKGROUND

Computing devices such as personal computers, laptop computers, tablet computers, cellular phones, body-mounted or wearable computers that provide near-eye displays, and other types of devices are available to provide information to users and to facilitate user interaction with information.

In one example, a computing device provides information to a user on a display element thereof. The information may include a media item, such as an image or a video. Illustratively, the media item may include a webpage that can be adjusted to a particular zoom or magnification to provide sufficient detail to the user. However, at the particular zoom or magnification, the webpage may be too large to fit entirely on the display element. Thus, the display element may provide a view of only a portion of the media item. Typically, the view can be navigated or moved throughout the media item to view different portions thereof.

The computing device may also provide a user interface to interact with the information. Such user interface may include a graphical user interface that is displayed on the display element. For example, when viewing a webpage using an Internet browser, various menu items can always be displayed at a top portion of a window. Further, a user may be able to utilize an input device to command the display element to provide menu items, such as by directing a cursor over the information using a mouse and "right-clicking" the mouse.

The above general examples for providing information to users and facilitating user interaction with information are well-known and useful. However, developments and changes in providing information and user interaction with information have also been contemplated.

The present disclosure is directed generally to systems, methods, program instructions, etc., for providing information to a user and facilitating user interaction with information in a manner that is generally intelligent, efficient, intuitive, unobtrusive, and/or to provide different options to a user.

SUMMARY

In one example, a non-transitory computer-readable medium includes instructions stored thereon for causing a display device to display a field of view of a media item. The field of view defines a reference point and is initially positioned at a first portion of the media item. In addition, the field of view is moveable relative to the media item. The computer-readable medium also includes instructions stored thereon for causing the display device to display a user interface over the media item. The user interface is initially aligned with and at least partially viewable in the field of view at the first portion of the media item and the user interface defines a perimeter. Further, the computer-readable medium includes instructions stored thereon for processing input data for controlling relative movement of one or more of the field of view, the media item, and the user interface. Still further, the computer-readable medium includes instructions stored thereon for causing the display device, responsive to the input data, to move the user interface relative to the field of view and the media item, provided that the reference point is within the perimeter. In addition, the computer-readable medium includes instructions stored thereon for causing the display device, responsive to the input data, to move the field of view relative to the media item, provided that the reference point is outside the perimeter.

In another example, a non-transitory computer-readable medium includes instructions stored thereon for causing a display device to display a field of view of a media item. The field of view defines a reference point and is initially positioned at a first portion of the media item. The field of view is also moveable relative to the media item. The computer-readable medium also includes instructions stored thereon for causing the display device to display a user interface over the media item. The user interface is initially aligned with and at least partially viewable in the field of view at the first portion of the media item and the user interface defines a perimeter. Further, the computer-readable medium also includes instructions stored thereon for processing input data for controlling relative movement of one or more of the field of view, the media item, and the user interface. Still further, the computer-readable medium includes instructions stored thereon for causing the display device, responsive to the input data, to move the field of view relative to the media item and the user interface, provided that the reference point is within the perimeter. In addition, the computer-readable medium includes instructions stored thereon for causing the display device, responsive to the input data, to remove the user interface, provided that the reference point is outside the perimeter. The computer-readable medium also includes instructions stored thereon for causing the display device, responsive to the input data and subsequent to the removal of the user interface, to display the user interface over the media item, wherein the user interface is aligned with and at least partially viewable in the field of view positioned at a second portion of the media item, provided that the field of view remains substantially stationary at the second portion of the media item.

In yet another example, a system includes a non-transitory computer-readable medium and program instructions stored on the non-transitory computer-readable medium and executable by at least one processor to cause a display device to display a field of view of a media item. The field of view defines a reference point and is initially positioned at a first portion of the media item. The system also includes program instructions stored on the non-transitory computer-readable medium and executable by at least one processor to cause the display device to display a user interface over the media item. The user interface is initially aligned with and at least partially viewable in the field of view at the first portion of the media item and the user interface defines a perimeter. Further, the system includes program instructions stored on the non-transitory computer-readable medium and executable by at least one processor to process input data for controlling relative movement of one or more of the field of view, the media item, and the user interface. In addition, the system includes program instructions stored on the non-transitory computer-readable medium and executable by at least one processor to cause the display device, responsive to the input data, to move the user interface relative to the field of view, provided that the reference point is within the perimeter, and to cause the display device, responsive to the input data, to remove the user interface, provided that the reference point is outside the perimeter. Still further, the system includes program instructions stored on the non-transitory computer-readable medium and executable by at least one processor to cause the display device, responsive to the input data and subsequent to the removal of the user interface, to display the user interface over the media item, wherein the user interface is aligned with and at least partially viewable in the field of view positioned at a second portion of the media item, provided that the field of view remains substantially stationary at the second portion of the media item.

In a further example, a method includes instructing a display device to display a field of view of a media item. The field of view defines a reference point and is initially positioned at a first portion of the media item. The method also includes instructing the display device to display a user interface over the media item. The user interface is initially aligned with and at least partially viewable in the field of view at the first portion of the media item and the user interface defines a perimeter. Further, the method includes receiving input data for controlling relative movement of one or more of the field of view, the media item, and the user interface. Still further, the method includes instructing the display device, responsive to the input data, to move the user interface relative to the field of view, provided that the reference point is within the perimeter, and instructing the display device, responsive to the input data, to remove the user interface, provided that the reference point is outside the perimeter. In addition, the method includes instructing the display device, responsive to the input data and subsequent to the removal of the user interface, to display the user interface over the media item, wherein the user interface is aligned with and at least partially viewable in the field of view positioned at a second portion of the media item, provided that the field of view remains substantially stationary at the second portion of the media item.

The foregoing summary is illustrative only and is not intended to be in any way limiting to scope of the present disclosure. In addition to the illustrative aspects, embodiments, examples, and features described above, further aspects, embodiments, examples, and features will become apparent by reference to the accompanying figures and the following detailed description.

DETAILED DESCRIPTION

Figure 1:
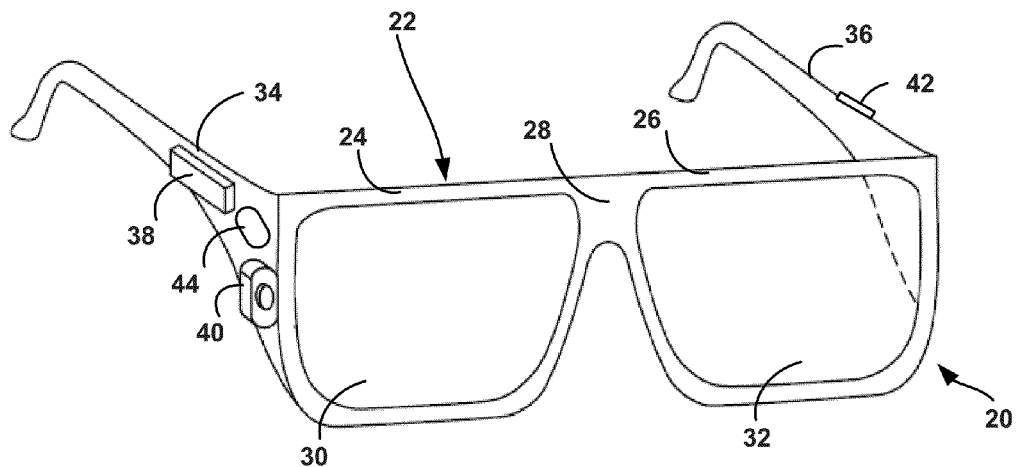
FIG. 1 is a generally front isometric view of a system capable of receiving, transmitting, and/or displaying data, in accordance with one example.

The present disclosure includes details of a computing or display device that controls a display element to provide information that is viewable by a user. In one non-limiting example, the display device may be a wearable computer, for example, a head-mounted display (HMD), which has a relatively small display element configured to be disposed near a wearer or user's eye such that displayed information on the display element fills part or all of a field of view of the user. In the present example, an HMD can provide information that appears to a user as a normal sized image, such as might be displayed on a traditional display device, for example, a computer screen.

In accordance with one aspect of the present disclosure, the display element of an HMD may provide a virtual window configured to display information, which may include a media item, such as an image or a video. Further, the virtual window may be configured to display a field of view (FOV) of an enlarged or magnified portion of the information or media item, also referred to herein as a world grid, and to scroll or pan the FOV throughout the world grid. In the present example, the FOV may define a reference point and the virtual window can provide a pointer or reticle associated with the reference point and viewable within the FOV. The virtual window can also display a graphical user interface (GUI) overlaid on the media item or world grid. The GUI facilitates user interaction with the display device and the media item and may include one or more menu items arranged within a menu grid defined generally by a periphery of the FOV.

In various examples, the display device is configured to receive user input data received through one or more input devices, such as a keypad, a mouse, a keyboard, one or more sensors, etc., and to responsively translate such input data to movements of the FOV with respect to the media item and to movements of the reticle with respect to the GUI. In one example, the input data may include sensor data that represents user gestures, such as head and/or eye movements. For instance, if a sensor detects that the user has looked up, down, left, or right, then the FOV may pan up, down, left, or right, respectively. Further, such gestures and other input data can allow a user to move the reference point of the FOV with respect to the GUI to interact with the same.

In addition, the GUI can be removed from a display so that the user can direct a generally unobstructed FOV to a desired portion of the media item and then the GUI can be displayed again so that the user can easily find and target menu items of the GUI within generally the same FOV as the desired portion of the media item.

It should be understood that the above example and other examples described herein are provided for illustrative purposes. As such, the examples should not be construed as limiting the scope of the invention. Further, while various examples are discussed herein with respect to HMD's, the concepts of the present disclosure are applicable to a wide variety of computing or display devices.

Referring now to FIG. 1, an example system 20 for receiving, transmitting, and/or displaying data to a user is shown in the form of a wearable computing device. While the system 20 of FIG. 1 is generally configured as an HMD 22 as an example of a wearable computing device, other types of wearable computing devices could additionally or alternatively be used. As illustrated in FIG. 1, the HMD 22 comprises frame elements, including lens frames 24, 26 and a center frame support 28, lens elements 30, 32, and extending side or support arms 34, 36. The center frame support 28 and the side arms 34, 36 are configured to secure the HMD 22 to a user's face via the user's nose and ears, respectively.

Each of the frame elements 24-28 and the side arms 34, 36 may be formed of a solid structure of plastic and/or metal, or may be formed of a hollow structure of similar material so as to allow wiring and component interconnections to be internally routed through the HMD 22. Other materials and designs may be possible as well.

One or more of the lens elements 30, 32 may be formed of any material that can suitably display a projected image or graphic. In one example, each of the lens elements 30, 32 are also sufficiently transparent to allow a user to see through the lens element. Combining these two features of the lens elements may facilitate an augmented reality display where a projected image or graphic is superimposed over a real-world view as perceived by the user through the lens elements 30, 32 so that the user can view the virtual window and the real world simultaneously.

The side arms 34, 36 may each be projections that extend away from the lens frames 24, 26, respectively, and may be positioned behind a user's ears to help secure the HMD 22 to the user. The side arms 34, 36 may further secure the HMD 22 to the user by extending around a rear portion of the user's head. Additionally or alternatively, for example, the system 20 may connect to or be affixed within a head-mounted helmet structure. Other possibilities exist as well.

The system 20 may also include an on-board computing system 38, a video camera 40, a sensor 42, and a finger-operable touch pad 44. The computing system 38 is shown to be positioned on the side arm 34 of the HMD 22 in FIG. 1. However, in other examples, the computing system 38 may be provided on other parts of the HMD 22 or may be positioned remotely from the HMD, for example, the computing system 38 can be coupled via a wired or wireless link to the HMD. The computing system 38 may include a processor and memory, for example. The computing system 38 may be configured to receive and analyze data from the video camera 40 and the touch pad 44 and to generate images for output by or on the lens elements 30, 32. In other examples, the computing system 38 may be configured to receive and analyze data from other sensory devices, user interfaces, or both.

In FIG. 1, the video camera 40 is shown positioned on the side arm 34 of the HMD 22. However, in other examples, the video camera 40 may be provided on other parts of the HMD 22. The video camera 40 may be configured to capture images at various resolutions or at different frame rates. Many types of video cameras with a small form-factor, such as those used in cell phones or webcams, for example, may be incorporated into various embodiments of the system 20.

Further, although FIG. 1 illustrates one video camera 40, more video cameras may be used and each camera may be configured to capture the same view or to capture different views. For example, the video camera 40 may be forward facing to capture at least a portion of the real-world view perceived by the user. Such forward facing image captured by the video camera 40 may then be used to generate an augmented reality where computer generated images appear to interact with the real-world view perceived by the user.

The sensor 42 is shown on the side arm 36 of the HMD 22. However, in other examples, the sensor 42 may be positioned on other parts of the HMD 22. The sensor 42 may include one or more components for sensing movement, such as one or more of a gyroscope or an accelerometer, for example. Further, the sensor 42 may include optical components such as an emitter and a photosensor for tracking movement of a user's eye. Other sensing devices may be included within, or in addition to, the sensor 42, or other sensing functions may be performed by the sensor.

The touch pad 44 is shown on the side arm 34 of the HMD 22. However, in other examples, the touch pad 44 may be positioned on other parts of the HMD 22. Further, more than one touch pad may be present on the HMD 22. Generally, the touch pad 44 may be used by a user to provide inputs to the device 22. The touch pad 44 may sense at least one of a position and a movement of a finger via capacitive sensing, resistance sensing, or a surface acoustic wave process, among other possibilities. The touch pad 44 may be capable of sensing finger movement in a direction parallel or planar to the pad surface, in a direction normal to the pad surface, or both, and may also be capable of sensing a level of pressure applied to the pad surface. The touch pad 44 may be formed of one or more translucent or transparent insulating layers and one or more translucent or transparent conducting layers. Edges of the touch pad 44 may be formed to have a raised, indented, or roughened surface, so as to provide tactile feedback to a user when the user's finger reaches the edge, or other area, of the touch pad. If more than one touch pad is present, each touch pad may be operated independently, and may provide a different function.

Figure 2:
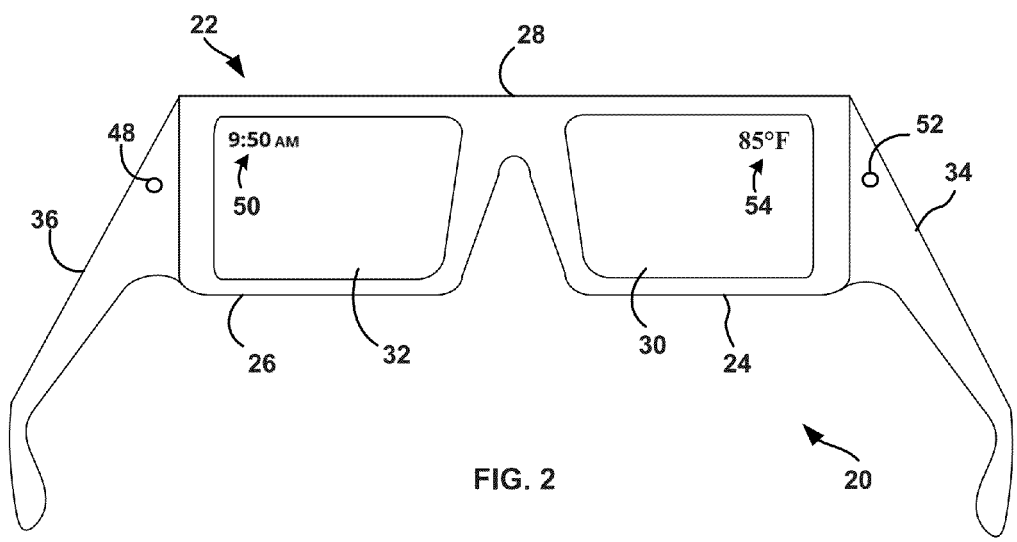
FIG. 2 is a generally back isometric view of the system of FIG. 1.

FIG. 2 illustrates an alternate view of the system 20 illustrated in FIG. 1. As shown generally in FIG. 2, the lens elements 30, 32 may act as display elements. The HMD 22 may include a first projector 48 coupled to an inside surface of the side arm 36 and configured to project a display 50 onto an inside surface of the lens element 32. Additionally or alternatively, a second projector 52 may be coupled to an inside surface of the side arm 34 and configured to project a display 54 onto an inside surface of the lens element 30.

The lens elements 30, 32 may act as a combiner in a light projection system and may include a coating that reflects the light projected onto them from the projectors 48, 52. In some embodiments, a reflective coating may not be used, for example, when the projectors 48, 52 are scanning laser devices.

In alternative embodiments, other types of display elements may also be used. For example, the lens elements 30, 32 may include a transparent or semi-transparent matrix display, such as an electroluminescent display or a liquid crystal display, one or more waveguides for delivering an image to the user's eyes, and/or other optical elements capable of delivering an in focus near-to-eye image to the user. A corresponding display driver may be disposed within or otherwise coupled to the frame elements 24-28, for example, for driving such a matrix display. Alternatively or additionally, a laser or LED source and scanning system could be used to draw a raster display directly onto the retina of one or more of the user's eyes. Other possibilities exist as well.

Figure 3:
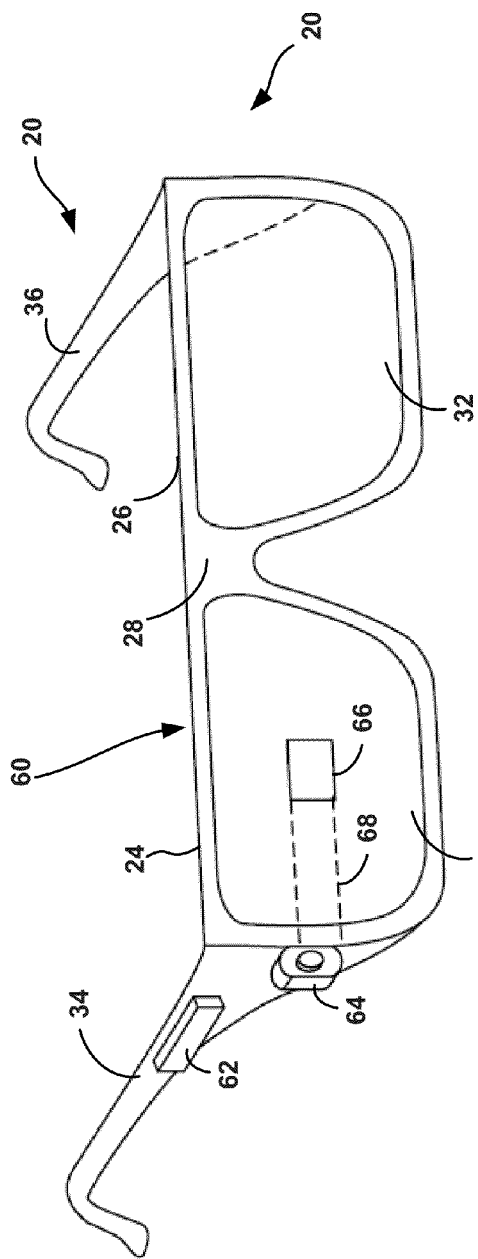
FIG. 3 a generally front isometric view of another system capable of receiving, transmitting, and/or displaying data, similar to the system of FIG. 1.

FIG. 3 illustrates another example system 20 for receiving, transmitting, and/or displaying data in the form of an HMD 60. The HMD 60 may include frame elements 24-28 and side arms 32, 34 such as those described with respect to FIGS. 1 and 2. The HMD 60 may additionally include an on-board computing system 62 and a video camera 64, such as those described with respect to FIGS. 1 and 2. The video camera 64 is shown mounted on the side arm 34 of the HMD 60. However, in other examples, the video camera 64 may be mounted at other positions as well.

The HMD 60 illustrated in FIG. 3 also includes a display 66, which may be coupled to the device in any suitable manner. The display 66 may be formed on a lens element of the HMD 60, such as the lens elements 30, 32 described with respect to FIGS. 1 and 2, and may be configured to overlay computer-generated graphics in the user's view of the physical world. The display 66 is shown to be provided generally in a center of the lens 30 of the computing device 60. However, in other examples, the display 66 may be provided in other positions. In the present example, the display 66 can be controlled by the computing system 62 that is coupled to the display via an optical waveguide 68.

Figure 4:
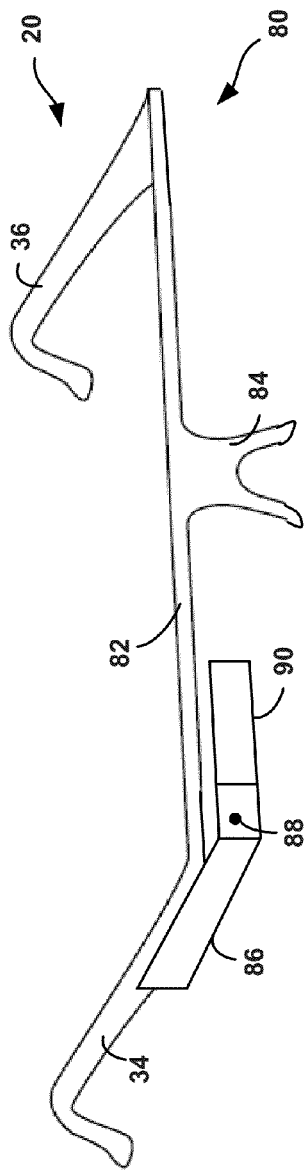
FIG. 4 a generally front, isometric view of another system capable of receiving, transmitting, and/or displaying data, similar to the system of FIG. 1.

FIG. 4 illustrates another example system 20 for receiving, transmitting, and displaying data in the form of an HMD 80. The wearable computing device 80 may include side-arms 34, 36, a center frame support 82, and a bridge portion with nosepiece 84. In the example shown in FIG. 4, the center frame support 82 connects the side-arms 34, 36. The HMD 80 does not include lens-frames containing lens elements. The wearable computing device 80 may additionally include an on-board computing system 86 and a video camera 88, similar to those described with respect to FIGS. 1 and 2.

The HMD 80 may include a lens element 90 that may be coupled to one of the side-arms 34, 36 or the center frame support 82. The lens element 90 may include a display such as the display described with reference to FIGS. 1 and 2, and may be configured to overlay computer-generated graphics upon the user's view of the physical world. In one example, the lens element 90 may be coupled to an inner side of the side arm 34 that is exposed to a portion of a user's head when the HMD 80 is worn by the user. The lens element 90 may be positioned in front of or proximate to a user's eye when the HMD 80 is worn by a user. For example, the lens element 90 may be positioned below the center frame support 82, as shown in FIG. 4.

Figure 5:
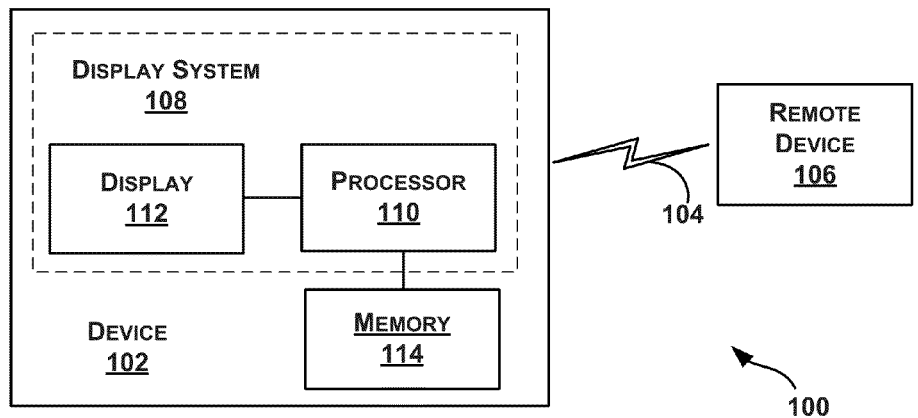
FIG. 5 is a block diagram of a computer network infrastructure, in accordance with one example.

FIG. 5 illustrates a schematic drawing of an example computer network infrastructure system 100. In the system 100, a device 102 communicates through a communication link 104, which can be a wired and/or wireless connection, to a remote device 106. The device 102 may be any type of device that can receive data and display information corresponding to or associated with the data. For example, the device 102 may be a wearable computing device, such as an HMD 22, 60, or 80 of FIGS. 1-4.

Thus, the device 102 may include a display system 108 with a processor 110 and a display element 112. The display element 112 may be, for example, an optical see-through display, an optical see-around display, or a video see-through display. The processor 110 may receive data from the remote device 106 and configure the data for display on the display element 112. The processor 110 may be any type of processor, such as a micro-processor or a digital signal processor, for example.

The device 102 may further include on-board data storage, such as memory 114 coupled to the processor 110. The memory 114 may store software that can be accessed and executed by the processor 110, for example.

The remote device 106 may be any type of computing device or transmitter including a laptop computer, a mobile telephone, or tablet computing device, etc., that is configured to transmit data to the device 102 or otherwise communicate with the device 102. The remote device 106 and the device 102 may contain hardware to enable the communication link 104, such as processors, transmitters, receivers, antennas, etc.

In FIG. 5, the communication link 104 is illustrated as a wireless connection. However, in other examples wired connections may also be used. For example, the communication link 104 may be a wired serial bus, such as a universal serial bus or a parallel bus. A wired connection may be a proprietary connection as well. The communication link 104 may also be a wireless connection using, for example, Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 106 may be accessible via the Internet and may include a computing cluster associated with a particular web service, for example, social-networking, photo sharing, address book, etc.

Figure 6:
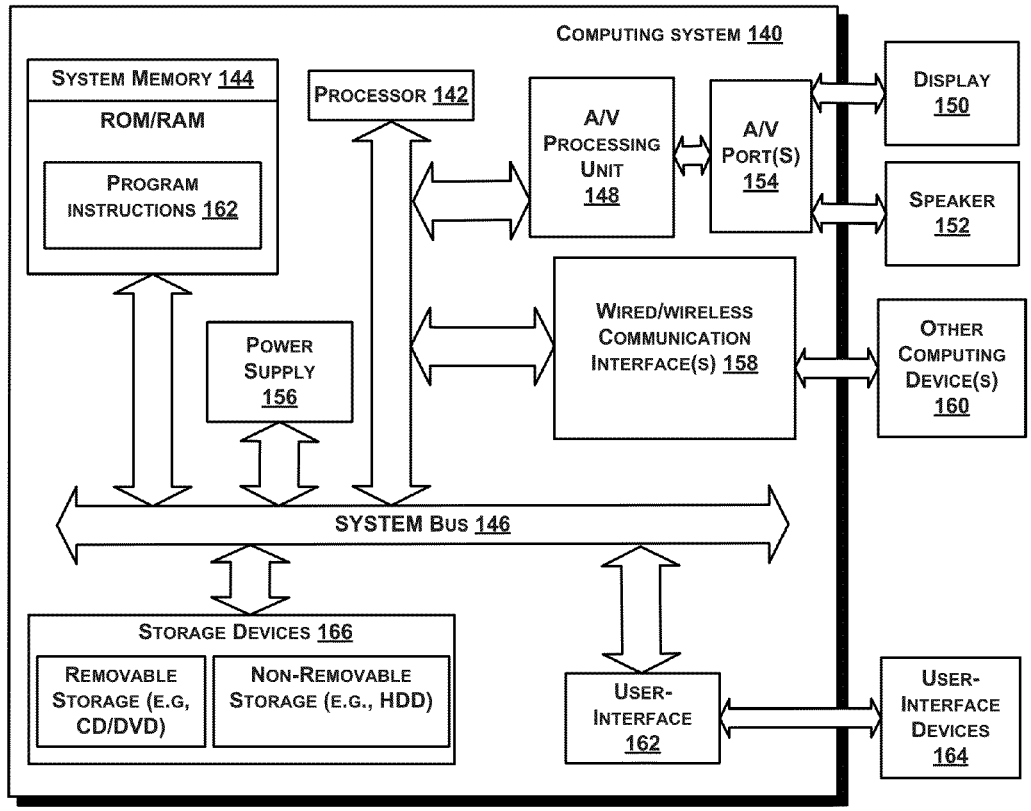
FIG. 6 is a block diagram of an example computing system that may be incorporated into the systems of FIGS. 1-4 and/or the infrastructure of FIG. 5.

As described above in connection with FIGS. 1-4, an example wearable computing device may include, or may otherwise be communicatively coupled to, a computing system, such as computing system 38 or 62. FIG. 6 is a block diagram depicting example components of a computing system 140 in accordance with one non-limiting example. Further, one or both of the device 102 and the remote device 106 of FIG. 5, may include one or more components of the computing system 140.

The computing system 140 may include at least one processor 142 and system memory 144. In the illustrated embodiment, the computing system 140 may include a system bus 146 that communicatively connects the processor 142 and the system memory 144, as well as other components of the computing system. Depending on the desired configuration, the processor 142 can be any type of processor including, but not limited to, a microprocessor (µP), a microcontroller (µC), a digital signal processor (DSP), and the like. Furthermore, the system memory 144 can be of any type of memory now known or later developed including but not limited to volatile memory (such as RAM), non-volatile memory (such as ROM, flash memory, etc.), or any combination thereof.

The computing system 140 of FIG. 6 also includes an audio/video (A/V) processing unit 148 for controlling a display element 150 and a speaker 152. The display element 150 and the speaker 152 can be coupled to the computing system 140 an A/V port 154. Further, the illustrated computing system 140 includes a power supply 156 and one or more communication interfaces 158 for connecting to and communicating with other computing devices 160. The display element 150 may be arranged to provide a visual depiction of various input regions provided by a user-interface module 162. For example, the user-interface module 162 may be configured to provide a GUI, such as examples GUIs described below in connection with FIGS. 7A-7F, and the display element 150 may be configured to provide a visual depiction of the GUI. The user-interface module 162 may be further configured to receive data from and transmit data to, or be otherwise compatible with, one or more user-interface or input devices 164. Such user-interface devices 164 may include a keypad, touch pad, mouse, sensors, and other devices for receiving user input data.

Further, the computing system 140 may also include one or more data storage devices or media 166 implemented in any method or technology for storage of information, such as computer readable instructions, data structures, program modules, or other data. The storage media can include volatile and nonvolatile, removable and non-removable storage media, for example, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium now known or later developed that can be used to store the desired information and which can be accessed by the computing system 140.

Figure 8:
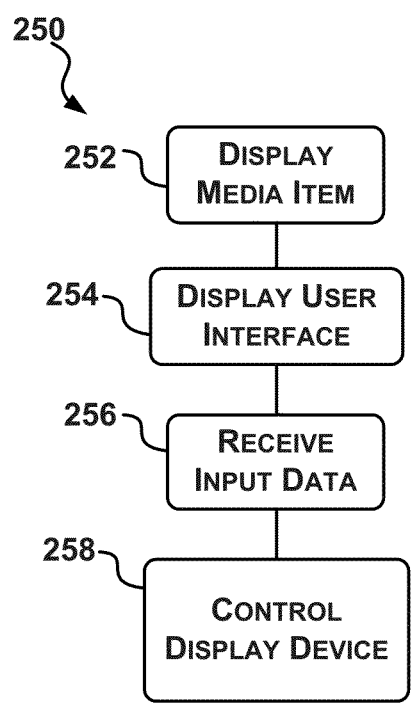
FIG. 8 is a flowchart that represents processes of an example method for controlling a display device and user interactions therewith, in accordance with an embodiment of the present disclosure.

According to an example embodiment, the computing system 140 may include program instructions 168 stored in the system memory 144 (and/or possibly in another data-storage medium) and executable by the processor 142 to facilitate the various functions described herein including, but not limited to, those functions described with respect to FIG. 8.

Although various components of computing system 140 are shown as distributed components, it should be understood that any of such components may be physically integrated and/or distributed according to the desired configuration of the computing system.

Referring now to FIGS. 7A-7F, various aspects of user-interfaces are shown in accordance with embodiments of the present disclosure. Such user-interfaces may be displayed by, for example, a wearable computing device, such as any of the wearable computing devices described above.

Figure 7A:
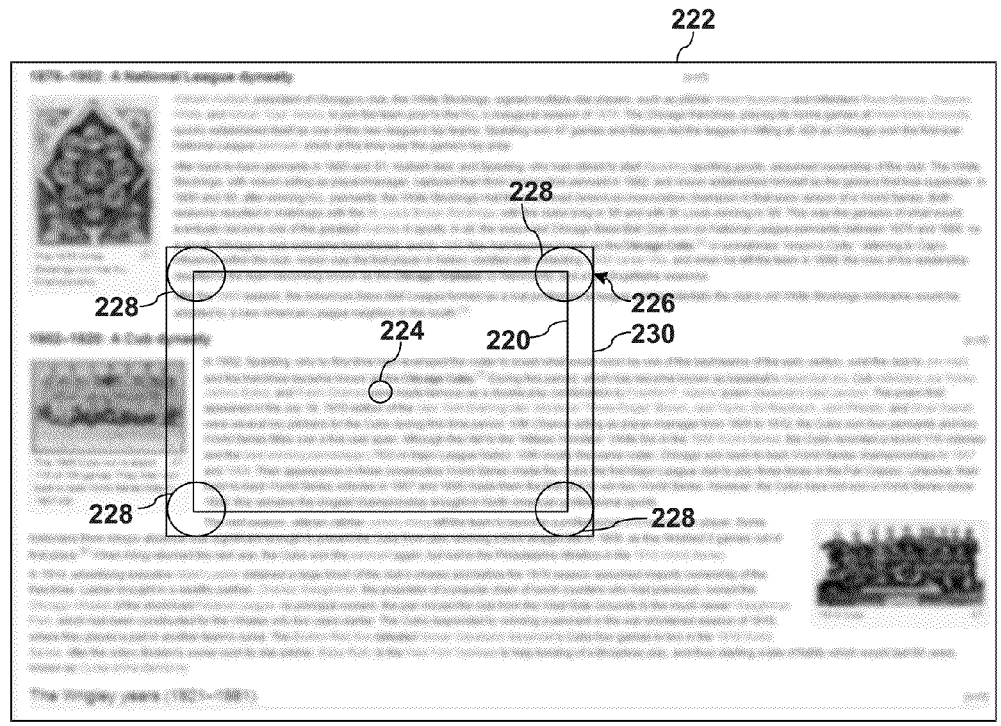
FIGS. 7A-7F illustrate user-interfaces, in accordance with embodiments of the present disclosure.

Referring to FIG. 7A, for example, a virtual window provides a field-of-view (FOV) 220 to a portion of a larger media item or world grid 222. In one non-limiting example, the world grid 222 may be a webpage and the FOV 220 defines a portion of the web page. The FOV 220 of FIG. 7A is generally rectangular, although, in other examples, the FOV 220 can be other sizes and shapes. In the present example, the FOV 220 can be scrolled or panned throughout the world grid 222 in response to user inputs to view other portions of the media item.

Further, the FOV 220 defines a reference point 224, which can be associated with a pointer, reticle, or other representation displayed in the FOV. Although, in some examples of the present disclosure, the reference point 224 may not be associated with a pointer or reticle displayed with the FOV 220. In one example, the reticle and/or reference point 224 is generally fixed with respect to the FOV 220. In FIG. 7A, the reticle and/or reference point 224 is generally centered within the FOV 220. Although, in other examples, the reticle and/or reference point 224 may be moveable with respect to the FOV 220 and/or positioned at other locations within the FOV 220.

The virtual window also provides a GUI 226 overlaid on the world grid 222. The GUI 226 includes one or more menu items 228 that are viewable within the FOV 220. In FIG. 7A, for example, the GUI 226 includes four menu items 228, which are represented by circles and arranged around a periphery of the FOV 220, generally at corners thereof. However, in other examples, the GUI 226 may include additional or fewer menu items 228 arranged in any suitable manner with respect to the FOV 220.

As will be discussed in greater detail hereinafter, the reticle and/or reference point 224 initially defines a center of a menu grid 230. The menu items 228 are associated with the menu grid 230. In FIG. 7A, the menu items are generally fixedly associated with corners of the menu grid 230.

In one example, a display device, such as a wearable computing device described above, is configured to display the FOV 220, the world grid 222, and the GUI 226. The display device is further configured to receive input data, for example, from one or more motion tracking sensors and/or other input devices, to control user interactions with displayed items and the display device. The flowchart of FIG. 8 represents processes of an example method 250 for controlling a display device and user interactions therewith. The method 250 can be performed by any of the systems and devices disclosed herein. Further, the method 250 may include one or more operations, functions, or actions as illustrated by one or more of blocks 252-258. Although the blocks 252-258 are illustrated in a sequential order, the blocks may also be performed in parallel, and/or in a different order than described herein. Also, method 250 may include additional or fewer blocks, as needed or desired. For example, the various blocks 252-258 may be combined into fewer blocks, divided into additional blocks, and/or removed based upon a desired implementation.

In addition, each block 252-258 may represent a module, a segment, or a portion of program code, which includes one or more instructions executable by a processor for implementing specific logical functions or steps in the process. The program code may be stored on any type of computer readable medium or storage device including a disk or hard drive, for example. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, and compact-disc read only memory (CD-ROM), for example. The computer readable media may also be any other volatile or non-volatile storage systems. The computer readable medium may be considered a computer readable storage medium, for example, or a tangible storage device. In addition, one or more of the blocks 252-258 may represent circuitry that is wired to perform the specific logical functions of the method 250.

In the method 250 of FIG. 8, at the block 252, a display device can be controlled to display a media item, such as the media item or world grid 222 of FIG. 7A. In one example, at the block 252, the display device can be controlled to display a FOV that defines a portion of the world grid 222, such as the FOV 220 over a portion of the media item 222 shown in FIG. 7A.

At the block 254, the display device can be controlled to display a user interface overlaid on the world grid. Referring to the example of FIG. 7A, the user interface or GUI 226 is viewable in the initial FOV 220 positioned at the first portion of the world grid. Further, in the present example, the GUI 226 includes one or more menu items 228. As illustrated in FIG. 7A, portions of the menu items 228 are viewable in the initial FOV 220.

In the method 250 of FIG. 8, control passes to the block 256 to receive input data from a user. The input data may include user gestures that are detected by sensors that track movements of a user's head and/or eye, for example. The input data may also include data from a touch pad or other input device. The input data can be used at the block 258 to control the display device. For example, at block 258, user gestures can be translated to relative movements between the FOV 220, the world grid 222, and/or the GUI 226. In one example, movements of the reticle and the reference point 224 with respect to the GUI 226 allow the user to move the reticle over a menu item 228 to select the same, for example.

The present disclosure contemplates various interactions between the input data received at the block 256 and relative movements between the FOV 220, the world grid 222, and/or the GUI 226 controlled at the block 258. FIGS. 7A-7F illustrate examples of such interactions. Generally in FIGS. 7A-7F, the world grid 222 can define a first plane, the menu grid 230 and the menu items 228 can define a second plane, and the FOV 220 and the reticle and/or reference point 224 can define a third plane.

Figure 7B:
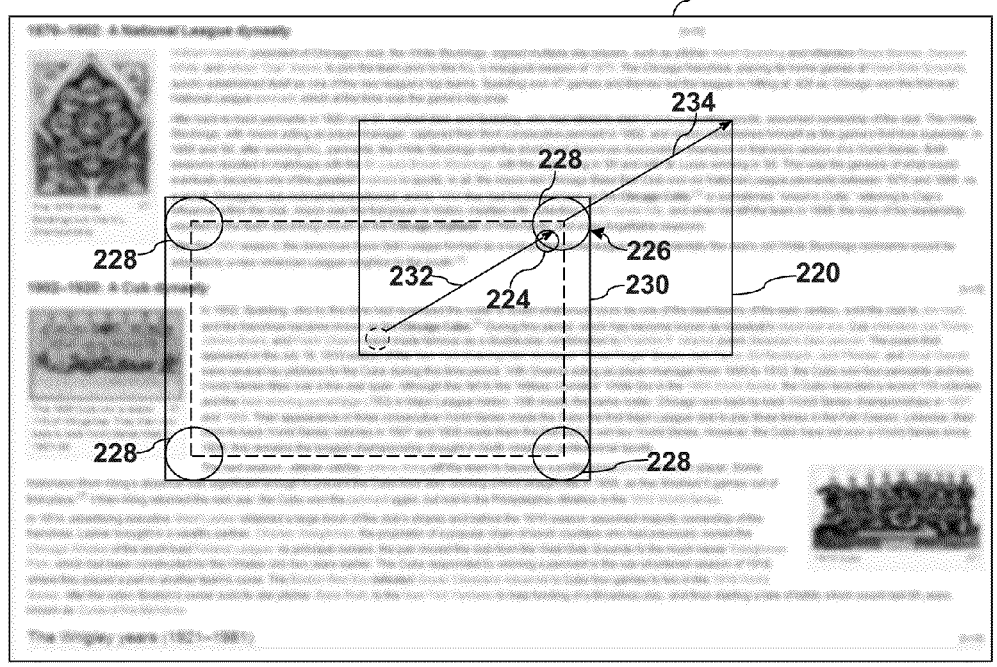

Referring now to FIG. 7B, the plane of the menu grid 230 is at least initially fixed with respect to the plane of the world grid 222. Consequently, input data 232, such as a user gesture to move the reticle and/or reference point 224 with respect to the world grid 22 and/or the menu grid 230, can cause a movement 234 of the FOV 220 and the reticle and reference point 224 with respect to the world grid 222 while the menu items 228 remain stationary with respect to the world grid. Thus, the user can direct the reticle and reference point 224 using the input data 232 toward the menu items 228 to highlight and/or select the same within generally the same initial FOV 220. In one example, when the reticle 224 is moved over a menu item 228, such menu item can be selected.

Figure 7C:
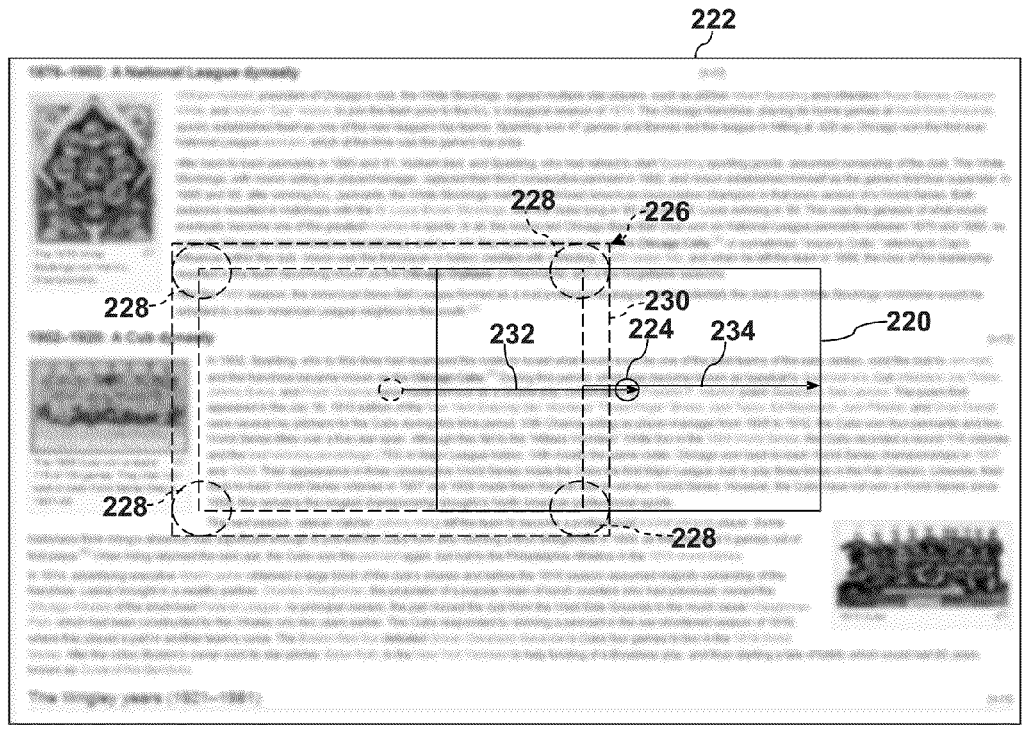
Figure 7D:
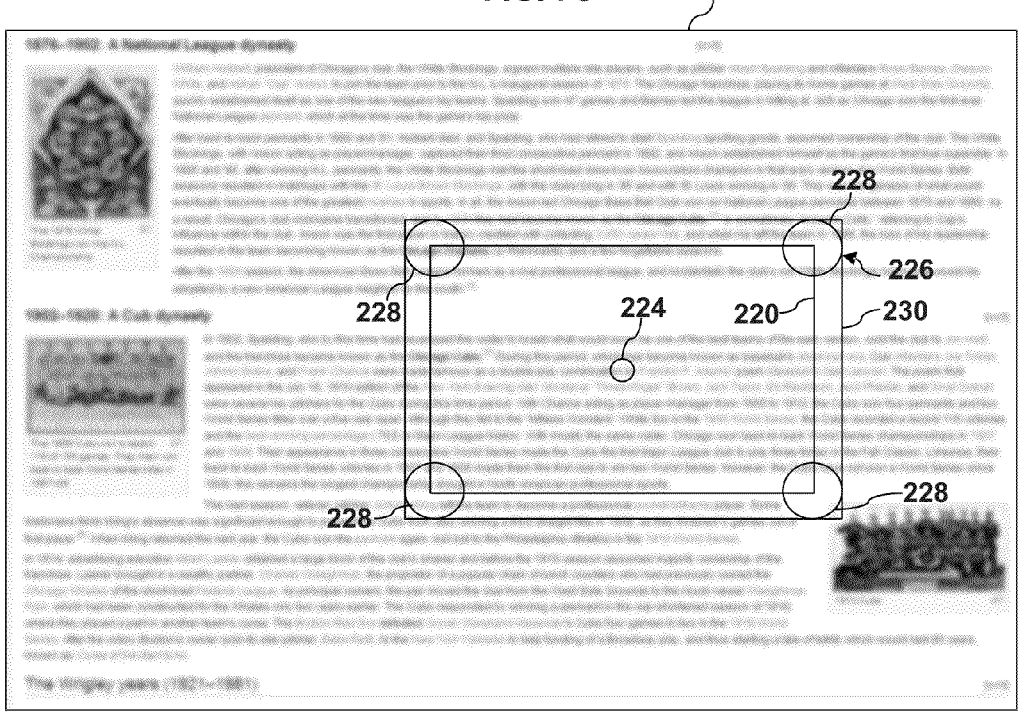

FIG. 7C illustrates an example where the reticle and/or reference point 224 are moved outside of the menu grid 230, which causes, at block 258 of FIG. 8, the removal of the menu items 228 from the display and allows the user to navigate the FOV 220 unobstructed by the GUI 226 around the world grid 222, as desired. As seen in FIG. 7D, when the FOV 220 and/or the reticle 224 substantially come to a rest, at block 258, the display device is controlled to display a new menu grid 230 and menu items 228. In FIG. 7D, the GUI 226 with the menu items 228 and the menu grid 230 are defined with respect to the new position of the FOV 220. Consequently, whenever the FOV 220 comes to a rest, the GUI 226 is made available so that the user can interact therewith within generally the same FOV. In one example, the menu items 228 float in and out of the FOV 220 as the display device is controlled to display and remove the GUI 226.

Figure 7E:
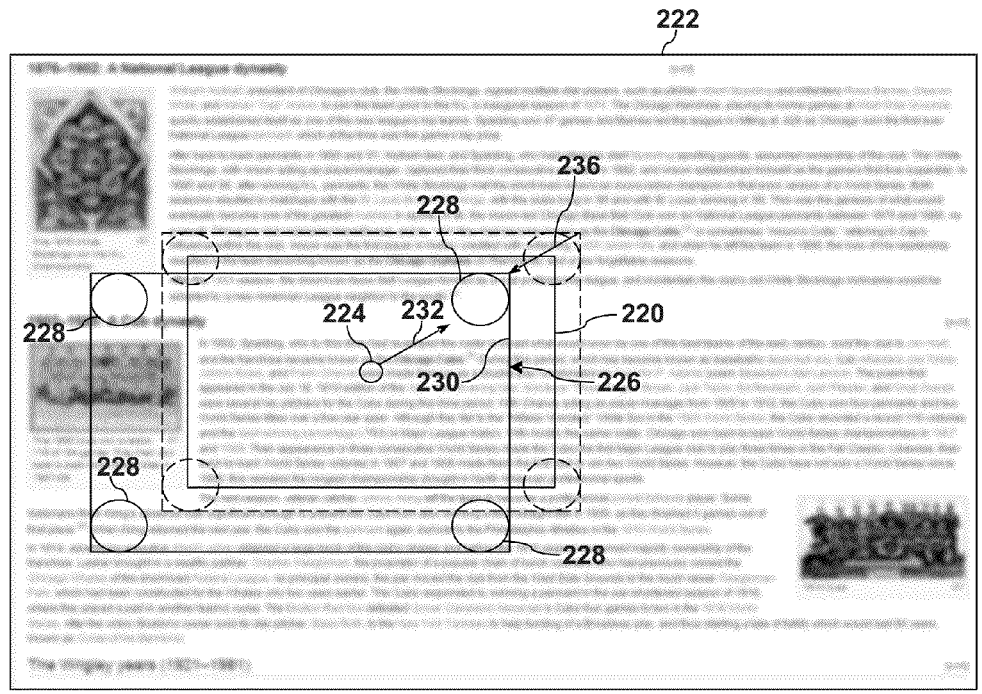

Referring to FIG. 7E, the plane of the menu grid 230 can be separate from the plane of the world grid 222. In the present example, input data 232, such as a user gesture to move the reticle and/or reference point 224, can cause a movement 236 of the menu grid 230 with respect to the reference point 224 and the FOV 220, while the FOV 220 remains stationary with respect to the world grid 222. Thus, the user can direct the reticle 224 using the input data 232 toward a particular menu item 228, which causes the menu item to move toward the reticle to facilitate selection of the same. In one example, if the reticle 224 is held stationary, the menu items 228 may drift back to their initial positions, such as the positions in FIG. 7A. Similarly to FIGS. 7C and 7D, in the present example, when the reticle and/or reference point 224 are moved outside of the menu grid 230, the menu items 228 disappear and the user can then navigate the FOV 220 around the world grid 222, as desired. When the reticle and/or reference point 224 substantially come to a rest, a new menu grid 230 is defined and the menu items 28 reappear.

Figure 7F:
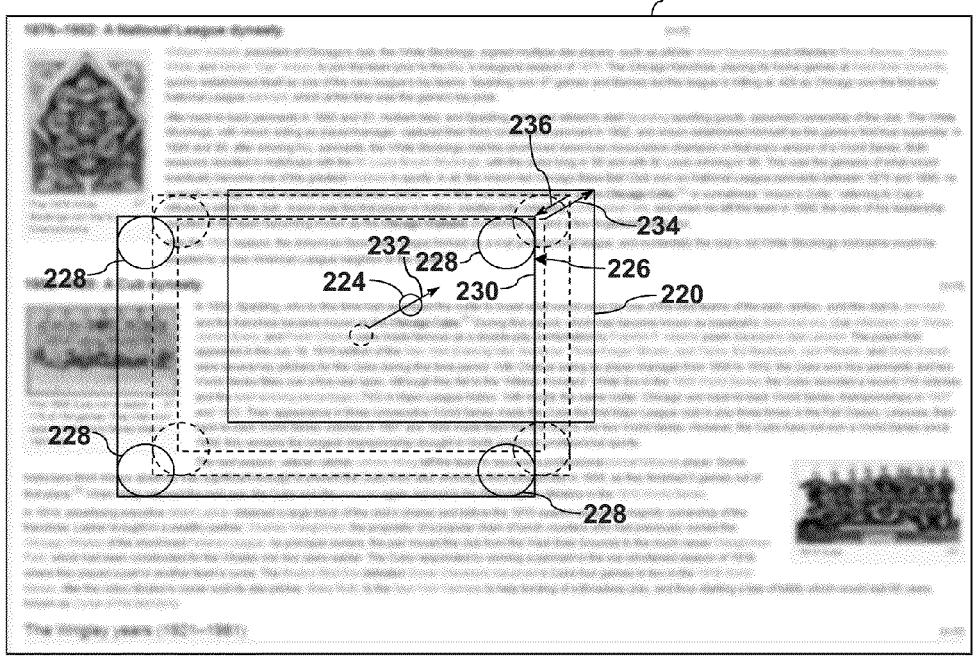

Referring to FIG. 7F, the plane of the menu grid 230, the plane of the world grid 222, and the plane of the FOV 220 can be distinct but associated with one another. In the present example, input data 232, such as a user gesture to move the reticle and/or reference point 224, can cause a movement 234 of the FOV 220 with respect to the world grid 222 and a movement 236 of the menu grid 230 with respect to the FOV and the reticle and/or reference point 224. As illustrated in FIG. 7F, the movement 234 of the FOV 220 is generally in an opposite direction to the movement 236 of the menu grid 230. Thus, the user can direct the reticle 226 using the input data 232 toward a particular menu item 228, which causes the menu item to move toward the reticle to allow selection of the same. In the present example, the input data 232 also causes the movement 234 of the FOV 20 with respect to the world grid 222 generally in the direction of the input data 232. Once the reticle and/or reference point 224 is disposed over a menu item 228 to select the same, the menu grid 230 and the FOV 220 generally remain stationary. Similarly to FIGS. 7C and 7D, in the present example, when the reticle and/or reference point 224 are moved outside of the menu grid 230, the menu items 228 disappear and the user can then navigate the FOV 220 around the world grid 222, as desired. When the reticle and/or reference point 224 substantially come to a rest, a new menu grid 230 is defined and the menu items 228 reappear.

According to another aspect of the present disclosure, the input data 232, such as a user gesture to move the reticle and/or reference point 224 toward a menu item 228, causes a movement 234 of the FOV 220 with respect to the world grid 222 that can be relative or proportional to a distance of the reticle and/or reference point 224 from an initial position of the reticle and/or reference point, such as a center of an initial menu grid 230. For example, in FIG. 7F, when the input data 232 is received to move the reticle and/or reference point 224 around the center of the initial menu grid 230, the FOV 220 can move at a relatively slow rate with respect to the input data. As the reticle 224 is moved away from the center of the initial menu grid 230, the FOV 220 can move at a faster rate around the world grid 222 with respect to the input data 232, and when the reticle 224 moves outside of the menu grid 230, the FOV 220 can move at an even faster rate around the world grid 222, for example, at a generally 1:1 rate, with respect to the input data 232.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A non-transitory computer-readable medium having instructions stored thereon, the instructions comprising:
   instructions for causing a display device to display a field of view of a media item, wherein the field of view defines a reference point and is initially positioned at a first portion of the media item, wherein the reference point is fixed with respect to the field of view, and wherein the field of view is moveable relative to the media item;
   instructions for causing the display device to display a user interface over the media item, wherein the user interface is initially aligned with and at least partially viewable in the field of view at the first portion of the media item, and wherein the user interface defines a perimeter;
   instructions for processing input data for controlling relative movement of one or more of the field of view, the media item, or the user interface;
   instructions for causing the display device, responsive to the input data, to move the user interface relative to at least one of the field of view or the media item, provided that the reference point is within the perimeter; and
   instructions for causing the display device, responsive to the input data, to move the field of view relative to the media item, provided that the reference point is outside the perimeter.

2. The non-transitory computer-readable medium of claim 1, further comprising instructions for causing the display device to fix the field of view with respect to the media item, provided that the reference point is within the perimeter.

3. The non-transitory computer-readable medium of claim 1, further comprising instructions for causing the display device, responsive to the input data, to remove the user interface and to move the field of view relative to the media item, provided that the reference point is outside the perimeter, and instructions for causing the display device, responsive to the input data and subsequent to the removal of the user interface, to display the user interface over the media item, wherein the user interface is aligned with and at least partially viewable in the field of view positioned at a second portion of the media item, provided that the field of view remains substantially stationary at the second portion of the media item.

4. The non-transitory computer-readable medium of claim 3, wherein the first and second portions of the media item are the same portion.

5. The non-transitory computer-readable medium of claim 1, wherein the user interface includes one or more menu items that are arranged within the perimeter of the user interface.

6. The non-transitory computer-readable medium of claim 5, wherein the field of view further includes a pointer associated with the reference point, and further comprising instructions for selecting a menu item of the one or more menu items in response to the input data causing movement of the pointer over the menu item.

7. The non-transitory computer-readable medium of claim 1, further comprising instructions for causing the display device, responsive to the input data, to move the user interface to its initial alignment with the field of view at the first portion of the media item, provided that the reference point is within the perimeter and the user interface is substantially stationary with respect to the field of view.

8. The non-transitory computer-readable medium of claim 1, wherein the input data includes data that represents one or more of head movement or eye movement of a user.

9. The non-transitory computer-readable medium of claim 1, wherein the display device is coupled to a wearable computer.

10. A non-transitory computer-readable medium having instructions stored thereon, the instructions comprising:
   instructions for causing a display device to display a field of view of a media item, wherein the field of view defines a reference point and is initially positioned at a first portion of the media item, and wherein the field of view is moveable relative to the media item; wherein the reference point is fixed with respect to the field of view,
   instructions for causing the display device to display a user interface over the media item, wherein the user interface is initially aligned with and at least partially viewable in the field of view at the first portion of the media item, and wherein the user interface defines a perimeter;
   instructions for processing input data for controlling relative movement of one or more of the field of view, the media item, or the user interface;
   instructions for causing the display device, responsive to the input data, to move the field of view relative to the media item and the user interface, provided that the reference point is within the perimeter;
   instructions for causing the display device, responsive to the input data, to remove the user interface and to move the field of view relative to the media item, provided that the reference point is outside the perimeter;
   instructions for causing the display device, responsive to the input data and subsequent to the removal of the user interface, to display the user interface over the media item, wherein the user interface is aligned with and at least partially viewable in the field of view positioned at a second portion of the media item, provided that the field of view remains substantially stationary at the second portion of the media item.

11. The non-transitory computer-readable medium of claim 10, further comprising instructions for causing the display device to fix the user interface with respect to the media item, provided that the reference point is within the perimeter.

12. The non-transitory computer-readable medium of claim 10, further comprising instructions for causing the display device, responsive to the input data, to move the user interface relative to the media item and the field of view, provided that the reference point is within the perimeter.

13. The non-transitory computer-readable medium of claim 12, wherein the movement of the field of view relative to the media item and the user interface is in a generally opposite direction from the movement of the user interface relative to the media item and the field of view.

14. The non-transitory computer-readable medium of claim 12, wherein a rate of movement of the field of view relative to the media item is proportional to a distance of the reference point from an initial position of the reference point defined by the field of view initially positioned at the first portion of the media item.

15. The non-transitory computer-readable medium of claim 10, wherein the user interface includes one or more menu items that are arranged within the perimeter of the user interface.

16. The non-transitory computer-readable medium of claim 15, wherein the field of view further includes a pointer associated with the reference point, and further comprising instructions for selecting a menu item of the one or more menu items in response to the input data causing movement of the pointer over the menu item.

17. The non-transitory computer-readable medium of claim 10, wherein the input data includes data that represents one or more of head movement or eye movement of a user.

18. The non-transitory computer-readable medium of claim 10, wherein the display device is coupled to a wearable computer.

19. A system comprising:
   a non-transitory computer-readable medium; and
   program instructions stored on the non-transitory computer-readable medium and executable by at least one processor to:
      cause a display device to display a field of view of a media item, wherein the field of view defines a reference point and is initially positioned at a first portion of the media item, wherein the reference point is fixed with respect to the field of view,
      cause the display device to display a user interface over the media item, wherein the user interface is initially aligned with and at least partially viewable in the field of view at the first portion of the media item, and wherein the user interface defines a perimeter,
      process input data for controlling relative movement of one or more of the field of view, the media item, or the user interface,
      cause the display device, responsive to the input data, to move the user interface relative to the field of view, provided that the reference point is within the perimeter,
      cause the display device, responsive to the input data, to remove the user interface and to move the field of view relative to the media item, provided that the reference point is outside the perimeter, and
      cause the display device, responsive to the input data and subsequent to the removal of the user interface, to display the user interface over the media item, wherein the user interface is aligned with and at least partially viewable in the field of view positioned at a second portion of the media item, provided that the field of view remains substantially stationary at the second portion of the media item.

20. The system of claim 19, further comprising program instructions stored on the non-transitory computer-readable medium and executable by at least one processor to cause the display to move the user interface relative to the field of view, while the field of view is fixed with respect to the media item, and provided that the reference point is within the perimeter.

21. The system of claim 19, further comprising program instructions stored on the non-transitory computer-readable medium and executable by at least one processor to cause the display to move the field of view relative to the media item and the user interface, while the user interface is fixed with respect to the media item, and provided that the reference point is within the perimeter.

22. The system of claim 19, further comprising program instructions stored on the non-transitory computer-readable medium and executable by at least one processor to cause the display to move the field of view relative to the media item and the user interface, and to move the user interface relative to the media item and the field of view, provided that the reference point is within the perimeter.

23. The system of claim 22, wherein the movement of the field of view relative to the media item and the user interface is in a generally opposite direction from the movement of the user interface relative to the media item and the field of view.

24. The system of claim 22, wherein a rate of movement of the field of view relative to the media item is proportional to a distance of the reference point from an initial position of the reference point defined by the field of view initially positioned at the first portion of the media item.

25. The system of claim 19, wherein the first and second portions of the media item are the same portion.

26. The system of claim 19, wherein the user interface includes one or more menu items that are arranged within the perimeter of the user interface.

27. The system of claim 26, wherein the field of view further includes a pointer associated with the reference point, and further comprising program instructions stored on the non-transitory computer-readable medium and executable by at least one processor to select a menu item of the one or more menu items in response to the input data causing movement of the pointer over the menu item.

28. The system of claim 19, wherein the input data includes data that represents one or more of head movement or eye movement of a user.

29. The system of claim 19, further comprising a display element, a user input device, and a processor, wherein the display element and the user input device are in communication with the processor, and the processor is configured to execute one or more of the program instructions.

30. The system of claim 29, wherein the display element is configured as a wearable computer.

31. A method comprising:
  instructing a display device to display a field of view of a media item, wherein the field of view defines a reference point and is initially positioned at a first portion of the media item, wherein the reference point is fixed with respect to the field of view,
  instructing the display device to display a user interface over the media item, wherein the user interface is initially aligned with and at least partially viewable in the field of view at the first portion of the media item, and wherein the user interface defines a perimeter,
  receiving input data for controlling relative movement of one or more of the field of view, the media item, or the user interface,
  instructing the display device, responsive to the input data, to move the user interface relative to the field of view, provided that the reference point is within the perimeter,
  instructing the display device, responsive to the input data, to remove the user interface and to move the field of view relative to the media item, provided that the reference point is outside the perimeter, and
  instructing the display device, responsive to the input data and subsequent to the removal of the user interface, to display the user interface over the media item, wherein the user interface is aligned with and at least partially viewable in the field of view positioned at a second portion of the media item, provided that the field of view remains substantially stationary at the second portion of the media item.

32. The method of claim 31, further comprising instructing the display to move the user interface relative to the field of view, while the field of view is fixed with respect to the media item, and provided that the reference point is within the perimeter.

33. The method of claim 31, further comprising instructing the display to move the field of view relative to the media item and the user interface, while the user interface is fixed with respect to the media item, and provided that the reference point is within the perimeter.

34. The method of claim 31, further comprising instructing the display to move the field of view relative to the media item and the user interface, and to move the user interface relative to the media item and the field of view, provided that the reference point is within the perimeter.

35. The method of claim 34, wherein the movement of the field of view relative to the media item and the user interface is in a generally opposite direction from the movement of the user interface relative to the media item and the field of view.

36. The method of claim 34, wherein a rate of movement of the field of view relative to the media item is proportional to a distance of the reference point from an initial position of the reference point defined by the field of view initially positioned at the first portion of the media item.

37. The method of claim 31, wherein the first and second portions of the media item are the same portion.

38. The method of claim 31, wherein the user interface includes one or more menu items that are arranged within the perimeter of the user interface.

39. The method of claim 38, wherein the field of view further includes a pointer associated with the reference point, and further comprising selecting a menu item of the one or more menu items in response to the input data causing movement of the pointer over the menu item.

40. The method of claim 31, wherein the input data includes data that represents one or more of head movement or eye movement of a user.

41. The method of claim 31, wherein the display element is configured as a wearable computer.

* * * * *